US009606681B2

(12) United States Patent
Rodzevski et al.

(10) Patent No.: US 9,606,681 B2
(45) Date of Patent: Mar. 28, 2017

(54) FINGER DETECTION ON TOUCH SCREENS FOR MOBILE DEVICES

(71) Applicant: Sony Mobile Communications Inc., Tokyo (JP)

(72) Inventors: Aleksandar Rodzevski, Malmö (SE); Peter Åberg, Vinslöv (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/312,025

(22) Filed: Jun. 23, 2014

(65) Prior Publication Data

US 2015/0009173 A1 Jan. 8, 2015

(30) Foreign Application Priority Data

Jul. 4, 2013 (EP) ..................................... 13175126

(51) Int. Cl.
*G06F 3/044* (2006.01)
*G06F 3/041* (2006.01)

(52) U.S. Cl.
CPC ............ *G06F 3/044* (2013.01); *G06F 3/0414* (2013.01); *G06F 2203/04106* (2013.01)

(58) Field of Classification Search
CPC ......... G06F 2203/04106; G06F 3/0414; G06F 3/044
USPC ....................................................... 345/173
See application file for complete search history.

(56) References Cited

U.S. PATENT DOCUMENTS

| 5,856,822 | A * | 1/1999 | Du et al. .......................... 345/73 |
| 7,948,478 | B2 | 5/2011 | Chuang |
| 2008/0252613 | A1* | 10/2008 | Chuang .......................... 345/174 |
| 2010/0253509 | A1* | 10/2010 | Fu ........................ G06F 19/3406 340/539.22 |
| 2012/0270611 | A1 | 10/2012 | Choi et al. |
| 2012/0293447 | A1* | 11/2012 | Heng ..................... G06F 3/0418 345/174 |
| 2013/0088094 | A1 | 4/2013 | Paik |
| 2013/0278539 | A1* | 10/2013 | Valentine ................ G06F 3/044 345/174 |

(Continued)

FOREIGN PATENT DOCUMENTS

| EP | 2261781 A1 | 12/2010 |
| EP | 2464099 A1 | 6/2012 |

OTHER PUBLICATIONS

Michael Karst et al.: "Humidity and Temperature Sensors in Mobile Phones"; Wireless communication alliance event, Apr. 18, 2012, pp. 1-18.

(Continued)

*Primary Examiner* — Viet Pham
(74) *Attorney, Agent, or Firm* — Tucker Ellis, LLP (57) ABSTRACT

A method for dynamically controlling an input mode of a touch screen (10) for an electronic device (1) comprising at least one condition detection system (4), wherein the method comprises monitoring humidity in the surrounding of the electronic device (1) by means of the condition detection system (4), and determining, based on the monitored humidity in relation to predetermined values, which input mode is to be used for the touch screen and using the determined input mode for the touch screen.

15 Claims, 7 Drawing Sheets

(56) References Cited

U.S. PATENT DOCUMENTS

2013/0342497 A1* 12/2013 Mo ........................ G06F 3/044
 345/174
2014/0002408 A1* 1/2014 Abbate et al. ................ 345/174

OTHER PUBLICATIONS

Extended European Search Report issued for European Application No. 13175126.5-1960, mailed on Dec. 20, 2013, 8 pages.

* cited by examiner

FINGER DETECTION ON TOUCH SCREENS FOR MOBILE DEVICES

TECHNICAL FIELD

The present invention relates to a touch screen for a mobile device that enhances and enables use of the touch screen while it is in a surrounding of high humidity or is partially or entirely covered with water or submerged in water.

BACKGROUND ART

The user demands on mobile devices drive the development of touch screens to, besides getting bigger and providing higher resolution, to be more durable and water proof/resistant. Since the display is representing most of the mechanical design it is quite significant that original equipment manufacturers (OEMs) are able to provide robust designs with displays that can take some hard impact and provide a rugged usability towards its users. This needs to be done without the costs of losing optical- and touch-performances and with a substantial industrial design maintaining a slim and integrated design appealing to the broad market.

However, mobile devices that are promoted as water resistant claims to be able to provide touch detection on the display even with a small amount of water on them, or at least after wiping away most of the water, but the touch detection is still quite poor.

EP 2 464 099 discloses an electronic apparatus comprising liquid detection on the surface of a display in order to turn off the entire display or the part of the display that is covered with water.

There is therefore a need for a touch detection system that allows the entire touch screen to be used while it is in a surrounding of high humidity or partially or entirely covered with water or while submerged in water and that maintains the touch resolution of the capacitive touch screen while no water or only a partial covering of water is present on the touch screen without adding any additional build height.

SUMMARY OF THE INVENTION

With the above description in mind, then, an aspect of the present invention is to provide a touch screen for a mobile device that can be used while partially or entirely covered with water or submerged in water which seek to mitigate, alleviate, or eliminate one or more of the above-identified deficiencies in the art and disadvantages singly or in any combination.

These and further objects are achieved by a method for controlling an input mode of a touch screen for an electronic device comprising at least one condition detection system. The method comprises the steps of: monitoring humidity in the surrounding of the electronic device by means of the condition detection system; determining, based on the monitored humidity in relation to predetermined values, if a first input mode using only capacitive sensing for the touch screen is to be used, or if a second input mode using only Z-force sensing for the touch screen is to be used for pressure detection, or if a third input mode being a combination of the first and second input modes for the touch screen is to be used; and using the determined input mode for the touch screen. By providing a method for controlling the input mode of a touch screen based on the surrounding humidity conditions, a simple and efficient way of ensuring touch functionality in any humidity condition is provided by fast, dynamic and automatic control of suitable input mode to be used for the touch screen making it easier for the user to operate the electronic device. Furthermore, any X- and Y-positioning of where on the touch screen the input is done is improved and more accurate by the inventive device and makes the device able to seamlessly switch to a more suitable input mode depending on the humid and wet conditions around and on the electronic device by itself.

Further objects and features of the present invention will appear from the following detailed description of aspects of the invention.

According to one aspect of the disclosure, it provides a method for controlling an input mode of a touch screen for an electronic device, by monitoring humidity in the surrounding of the electronic device by means of the condition detection system detecting signals resulting from input on the touch screen. By providing a method that enables switching of input mode by analyzing the input signals from the touch screen, a cost efficient way of ensuring touch functionality in any humidity condition without the need for a separate humidity sensor is provided. This detection of signals by means of the touch screen is done by profiling of water/droplet patterns indicating presence of water on the touch screen, in different amounts, volumes and/or patterns on the screen. This detection of signals generated by water by the touch screen and its associated circuitry and stored predefined water amounts, volumes and/or patterns and their change rates, e.g. when water flows over the touch screen, may be done by probability calculations and comparing finger patterns with different water patterns, water volumes and/or water amounts on the screen to improve positioning of where on the touch screen the input is done and make the positioning more accurate by the inventive device being able to switch to a more suitable input mode depending on the humid and wet conditions around the electronic device by itself.

According to a further aspect of the disclosure, it provides a method for controlling an input mode of a touch screen by monitoring humidity in the surrounding of the electronic device by means of the condition detection system detecting signals being separate from signals resulting from input on the touch screen. By providing a method that enables switching of input mode by analyzing signals separate from signals generated by input on the touch screen, an accurate, quick and more predictable method of switching between different input modes that ensures touch functionality in any humidity condition is provided.

According to a further aspect of the disclosure, it provides a method for controlling an input mode of a touch screen by monitoring humidity in the surrounding of the electronic device by means of the condition detection system detecting signals resulting from input on the touch screen and detecting signals separate from the signals resulting from input on the touch screen. By providing a method that enables switching of input mode by analyzing signals generated both from input on the touch screen and by other ways/means/sources than input on the touch screen, a redundant and fail proof method of switching between different input modes that ensures touch functionality in any humidity condition is provided, e.g. when the electronic device is only partially submerged in water. This detection of signals by means of the touch screen is done by profiling of water/droplet patterns indicating presence of water on the touch screen, in different amounts, volumes and/or patterns on the screen. This detection of signals generated by water by the touch screen and its associated circuitry and stored predefined water amounts, volumes and/or patterns and their change rates, e.g. when water flows over the touch screen, may be done by probability calculations and comparing finger patterns with different water patterns, water volumes and/or water amounts on the screen to improve positioning of where on the touch screen the input is done and make the positioning more accurate by the inventive device in combination with the separate detection of signals that further enhance the switching to a more suitable input mode depending on the humid and wet conditions around the electronic device by itself.

According to another aspect of the disclosure, it provides a method for controlling an input mode of a touch screen by determining, based on the monitored humidity in relation to predetermined values, if the monitored humidity is below a predetermined value, that the first input mode using only the capacitive sensing for the touch screen is to be used. By providing a method that enables only the capacitive sensing for the touch screen when the relative humidity level is below a predetermined value, the resolution and accuracy of a capacitive touch detection system can be maintained while operating in less humid conditions.

According to another aspect of the disclosure, it provides a method for controlling an input mode of a touch screen by determining, based on the monitored humidity in relation to predetermined values, if the monitored humidity is greater than a predetermined value, that the second input mode using only the Z-force touch sensing for the touch screen is to be used for pressure detection and for detecting position of touch input. By providing a method that enables only z-force sensing for the touch screen when the relative humidity level is greater than a predetermined value, the touch functionality of the touch screen can be maintained while operating in humid/wet conditions, e.g. when the electronic device is fully submerged in water or if in a downpour.

According to another aspect of the disclosure, it provides a method for controlling an input mode of a touch screen by determining, based on the monitored humidity in relation to predetermined values, if the monitored humidity is below a predetermined value, that the first input mode using only the capacitive sensing for the touch screen is to be used or if the monitored humidity is greater than a predetermined value, that the second input mode using only the Z-force touch sensing for the touch screen is to be used for pressure detection and for detecting position of touch input. By providing a method that enables only the capacitive sensing for the touch screen when the relative humidity level is below a predetermined value and that enables only z-force sensing for the touch screen when the relative humidity level is greater than a predetermined value, the resolution and accuracy of a capacitive touch detection system is maintained while operating in less humid conditions and the touch functionality of the touch screen is maintained while operating in humid/wet conditions, e.g. when the electronic device is fully submerged in water or if in a downpour.

According to a further aspect of the disclosure, it provides a method for controlling an input mode of a touch screen according to any preceding claim, by determining, based on the monitored humidity in relation to predetermined values, if the monitored decrease rate of the humidity is larger than a predetermined value, that the first input mode using only the capacitive sensing for the touch screen is to be used. By providing a method that enables switching of input mode by analyzing the decrease rate in humidity level, a fast and accurate way of determining if, e.g. the electronic device is retrieved from water and therefore is in need of switching input mode to capacitive sensing, is provided.

According to a further aspect of the disclosure, it provides a method for controlling an input mode of a touch screen by determining, based on the monitored humidity in relation to predetermined values, if the monitored increase rate of the humidity is larger than a predetermined value, that the second input mode using only the Z-force touch sensing for the touch screen is to be used for pressure detection and for detecting position of touch input. By providing a method that enables switching of input mode by analyzing the increase rate in humidity level, a fast and accurate way of determining if, e.g. the electronic device is submerged or even dropped by mistake in water and therefore is in need of switching input mode to Z-force touch sensing, is provided.

According to a further aspect of the disclosure, it provides a method for controlling an input mode of a touch screen according to any preceding claim, by determining, based on the monitored humidity in relation to predetermined values, if the monitored decrease rate of the humidity is larger than a predetermined value, that the first input mode using only the capacitive sensing for the touch screen is to be used or if the monitored increase rate of the humidity is larger than a predetermined value, that the second input mode using only the Z-force touch sensing for the touch screen is to be used for pressure detection and for detecting position of touch input. By providing a method that enables switching of input mode by analyzing the decrease and increase rate in humidity level, a fast and accurate way of determining if, e.g. the electronic device is retrieved from water and therefore is in need of switching input mode to capacitive sensing or if the electronic device is suddenly submerged in water and is in need of switching to Z-force touch sensing, is provided.

According to a further aspect of the disclosure, it provides a method for controlling an input mode of a touch screen based on the monitored humidity in relation to predetermined values, if the monitored humidity is below a predetermined value, that the first input mode using the capacitive sensing and the second input mode using the Z-force touch sensing for pressure detection is to be used as the third input mode by the touch screen. By providing a method that enables the use of the Z-force touch sensing for detecting applied finger/stylus pressure in combination with capacitive touch sensing, a more accurate and diverse way of interacting with the electronic device is provided. A further benefit of this aspect is that the different touch detection systems can validate real touch inputs and eliminate false inputs generated be e.g. water drops.

According to another aspect of the disclosure, it provides a method for controlling an input mode of a touch screen by determining, based on the monitored humidity in relation to predetermined values, if the monitored humidity is below 100% relative humidity, that the first input mode using only the capacitive sensing for the touch screen is to be used. By providing a method that enables only the capacitive sensing for the touch screen when the relative humidity level is below 100% relative humidity, the resolution and accuracy of a capacitive touch detection system can be maintained while operating in less humid conditions.

According to yet another aspect of the disclosure, it provides a method for controlling an input mode of a touch screen, by determining, based on the monitored humidity in relation to predetermined values, if the monitored humidity is greater than or equal to 100% relative humidity, that the second input mode using only the Z-force touch sensing for the touch screen is to be used for pressure detection and for detecting position of touch input. By providing a method that enables only z-force sensing for the touch screen when the relative humidity level is greater than or equal to 100% relative humidity, the touch functionality of the touch screen can be maintained while operating in humid/wet conditions, e.g. when the electronic device is fully submerged in water, e.g. during diving, or if in a downpour.

According to another aspect of the disclosure, it provides a method for controlling an input mode of a touch screen, by determining, based on the monitored humidity in relation to predetermined values, if the monitored humidity is below 100% relative humidity, that the first input mode using the capacitive sensing and the second input mode using the Z-force touch sensing for pressure detection is to be used as the third input mode by the touch screen. By providing a method that enables use of two touch detection systems at once, a more accurate, quick and diverse way of interacting with the electronic device is provided. A further benefit of this aspect is that the different touch detection systems can validate real touch inputs and eliminate false inputs generated be e.g. water drops.

The above and further objects are also achieved by an electronic device comprising a touch screen; at least two touch detection systems and at least one condition detection system, wherein the touch screen is configured for operation in one input mode or an input mode being a combination of two input modes, a memory, the condition detection system is configured to monitor humidity in the surrounding of the electronic device, the electronic device further comprising a humidity condition handling and processing unit arranged to determine, based on the monitored humidity in relation to predetermined values, if a first input mode using only a capacitive touch detection system for the touch screen is to be used, or if a second input mode using only a Z-force touch detection system for the touch screen is to be used for pressure detection, or if a third input mode being a combination of the first and second input modes for the touch screen is to be used, and to set the determined input mode to be used by the touch screen.

The above are also achieved by below aspects of the invention, and further objects and features will appear from the following detailed description of aspects of the invention.

According to another aspect of the disclosure, it provides an electronic device, wherein the condition detection system is configured to detect signals from input on the touch screen and to evaluate these signals resulting from the input on the touch screen, which input signals are affected by the humidity in the surrounding of the electronic device indicating the level of humidity in the surrounding of the electronic device.

According to a further aspect of the disclosure, it provides an electronic device comprising a humidity sensor generating signals being separate from signals generated by input on the touch screen and the condition detection system is configured to detect the signals from the humidity sensor and to evaluate the signals from the humidity sensor indicating the level of humidity in the surrounding of the electronic device.

According to yet another aspect of the disclosure, it provides an electronic device wherein the condition detection system is configured to detect signals resulting from input on the touch screen and to detect signals from a humidity sensor generating signals being separate from the signals resulting from input on the touch screen and to evaluate these signals indicating the level of humidity in the surrounding of the electronic device.

According to yet another aspect of the disclosure, it provides an electronic device, wherein the humidity condition handling and processing unit is configured to, if the monitored humidity is below a predetermined value, set the first input mode with only the capacitive touch detection system to be used by the touch screen.

According to yet another aspect of the disclosure, it provides an electronic device wherein the humidity condition handling and processing unit is configured to, if the monitored humidity is greater than a predetermined value, set the second input mode with only the Z-force touch detection system to be used by the touch screen for pressure detection and for detecting position of touch input.

According to yet another aspect of the disclosure, it provides an electronic device, wherein the humidity condition handling and processing unit is configured to, if the monitored humidity is below a predetermined value, set the first input mode with only the capacitive touch detection system to be used by the touch screen or if the monitored humidity is greater than a predetermined value, set the second input mode with only the Z-force touch detection system to be used by the touch screen for pressure detection and for detecting position of touch input.

According to a further aspect of the disclosure, it provides an electronic device wherein the humidity condition handling and processing unit is configured to, if the monitored humidity is below a predetermined value, set the first input mode with capacitive touch detection system and the second input mode with Z-force touch detection system for pressure detection as the third input mode to be used by the touch screen.

To sum up, the method and device according to the invention above enable an improved seamless touch interaction for the end user when using the electronic device no matter if the device is used under water; in the boundary between water and air, e.g. halfway submerged in water; and in air, both in dry, wet and humid conditions.

BRIEF DESCRIPTION OF THE DRAWINGS

The present technique will be more readily understood through the study of the following detailed description of the embodiments/aspects together with the accompanying drawings, of which.

DETAILED DESCRIPTION

It should be added that the following description of the embodiments is for illustration purposes only and should not be interpreted as limiting the disclosure exclusively to these embodiments/aspects.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Embodiments of the present invention will be exemplified using a mobile communication device such as a mobile phone. However, it should be appreciated that the invention is as such equally applicable to electronic devices which have touch detection capabilities. Examples of such devices may for instance be any type of mobile phone, laptop (such as standard, ultra portables, netbooks, and micro laptops) handheld computers, portable digital assistants, tablet computers, gaming devices, accessories to mobile phones, etc. However, for the sake of clarity and simplicity, the embodiments outlined in this specification are exemplified with, and related to, mobile phones only.

Figure 1:
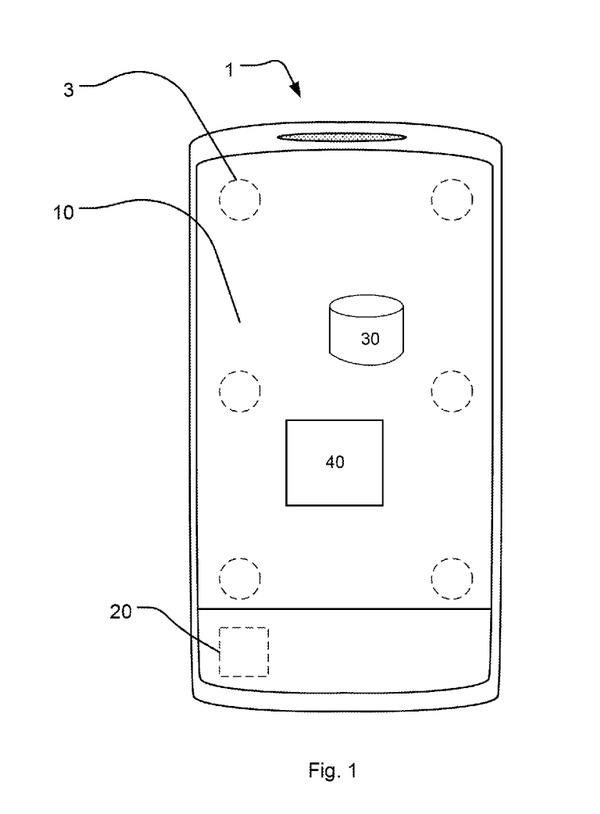
FIG. 1 illustrates an electronic device where the present invention can be implemented.

FIG. 1 illustrates an electronic device 1. Examples of such devices are mobile phones, smartphones, laptops touch pads and etc.

The electronic device 1 comprises a humidity condition handling and processing unit 40 that may be constituted by any suitable Central Processing Unit, CPU, microcontroller, Digital Signal Processor, DSP, etc., capable of executing computer program code for evaluating and comparing signals indicating humidity levels in the surrounding of the electronic device and altering the input mode of the electronic device 1. A software humidity state handler 200 may be implemented utilizing the humidity condition handling and processing unit 40 for determination and switching between different input modes. The electronic device 1 further comprises a memory 30 that can be used for storing computer program code, old humidity values and threshold humidity values etc. The memory 30 can be any combination of a Read and write Memory, RAM, and a Read Only Memory, ROM. The memory 30 may also comprise persistent storage, which, for example, can be any single one or combination of magnetic memory, optical memory, or solid state memory or even remotely mounted memory. The electronic device 1 also comprises components required for its operation, e.g. a battery (not shown), but these components are not explained further as this is common knowledge for a skilled person.

The electronic device 1 also comprises a touch screen 10 that is an integrated combination of two separate touch detection systems, one being a capacitive touch detection system 2 and the other being a z-force touch detection system 3 capable of registering pressure and/or touch position on the touch screen 10. The z-force touch detection system 3 is here illustrated as a plurality of pressure sensors arranged along the periphery of the touch screen but it should also be understood that the z-force touch detection system can be constituted by a single pressure sensor, a plurality of pressure sensors arranged according to a different pattern, a pressure sensitive film etc. The functionalities of pressure sensors and positioning of input using pressure sensors is know in the art and will not be described in further detail.

The electronic device 1 may further comprise a separate humidity sensor 20 arranged to measure humidity in the surrounding of the device. The humidity sensor may in a preferred embodiment be a capacitive humidity sensor, e.g. implemented by the touch screen 10 itself. The humidity sensor is capable of measuring relative humidity in the range of 0% to 100% relative humidity with a reading rate of at least 1 reading per second. There is a possibility of also detecting water on the display through the capacitive touch detection system but this could only be used for detecting abnormal signal areas caused by water and not provide a linear water percentage/detection.

Figure 2:
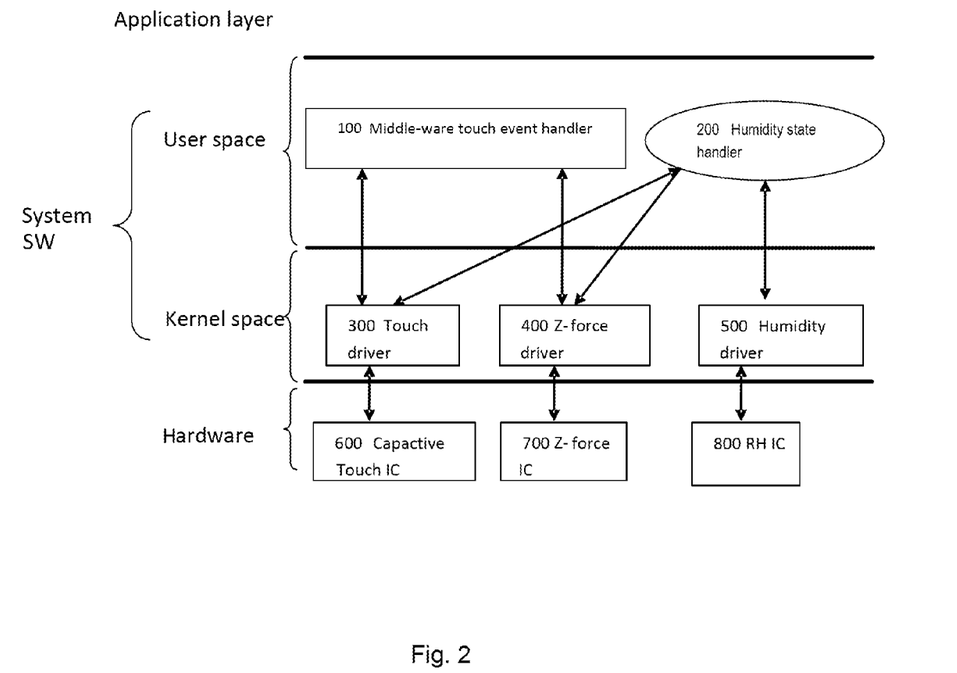
FIG. 2 illustrates a block diagram of a typical implementation of the present invention.

FIG. 2 illustrates a block diagram of a typical implementation of the present invention where the electronic device 1 comprises a middle-ware touch event handler 100, which is a software component that is arranged to register events from any touch input driver 300, 400 and to dispatch them through the concerned operative parts of the electronic device 1. The middleware touch event handler 100 listens for any registered input device with proper touch input capabilities and then makes sure that the reported positions are propagated through the concerned parts of the electronic device 1 according to its application programming interfaces. This means that two (or more) registered touch reporting drivers 300, 400 could be running on the same system without interfering with each other and that the reported finger positions will be transparent towards client applications. The electronic device 1 also comprises a humidity state handler 200 being a software component, which is executed on the humidity condition handling and processing unit 40, that is able to implement an algorithm which keeps track of the relative humidity, together with system time, and then out of this estimate knows when to deactivate a capacitive touch driver 300 and activate a z-force driver 400 instead for reporting detected input, and vice versa for switching back to the capacitive driver 300. The humidity state handler 200 also enables automatic selection of an input mode in which the z-force driver 400 is enabled to report the applied pressure of an input by means of finger(s) whilst the finger position is detected through the capacitive touch driver 300.

In a further embodiment both the capacitive touch driver 300 and the z-force driver 400 can be active simultaneously for achieving a higher reliability while operating in conditions where the probability of a false input, e.g. a water drop, on the touch screen is high. In such an embodiment, the z-force touch detection system 3 can be used to validate a touch input on the more accurate capacitive touch detection system 2 by both systems reporting a detected finger position and using real time comparison of the positions registered by the respective system to ensure that the correct position is reported to the touch event handler 100.

Hence, any X- and Y-positioning of where on the touch screen the input is done is improved and more accurate by the inventive device being able to switch to a more suitable input mode depending on the humid conditions around the electronic device by itself.

This detection of signals by means of the touch screen 10 is done by profiling of water/droplet patterns indicating presence of water on the touch screen, in different amounts, volumes and/or patterns on the screen. This detection of signals generated by water by the touch screen 10 and its associated circuitry being the condition detection system 4 and the capacitive touch detection system 2 and stored predefined water amounts, volumes and/or patterns may be done by probability calculations and comparing finger patterns with different water patterns, water volumes and/or water amounts on the screen. One example of such signal detection is embodied by defining an area of a finger touching the screen, e.g. defining that a finger is not larger than 1×1 cm or 2×2 cm or the like, wherefore any detected signals indicating a touching area being larger than that is not a finger. Moreover, flowing water and/or droplets are also easily detectable due to generated signals indicating an increasing area and/or a changing touching area, which would not be a finger with a constant touch area.

As a further embodiment, manual selection of a preferred input mode being capacitive touch detection or z-force touch detection alone or in combination that overruns the automatic selection is possible.

As an additional embodiment, the invention could also utilize a barometric pressure sensor in the electronic device 1, in order to keep track of critical depth levels under water and notifying the user prior to damage and/or make sure to shut down the electronic device 1 as a system-rescue attempt.

The electronic device 1 also comprises a capacitive touch integrated circuit 600 physically connected to a traditional conductive indium tin oxide layer which handles capacitive touch detection on the display, i.e. the touch screen 10, and reports finger positions.

The electronic device 1 also comprises a z-force integrated circuit 700 physically connected to a pressure sensing frame (or similar) which detects applied pressure on the touch screen 10 and also is able to extract a finger position.

The electronic device 1 also comprises a relative humidity integrated circuit 800 that typically incorporates a sensing element, i.e. a humidity sensor, which needs to be mounted on the electronic device with a surface or opening exposed towards its surrounding so that it can detect the ambient humidity.

Figure 3:
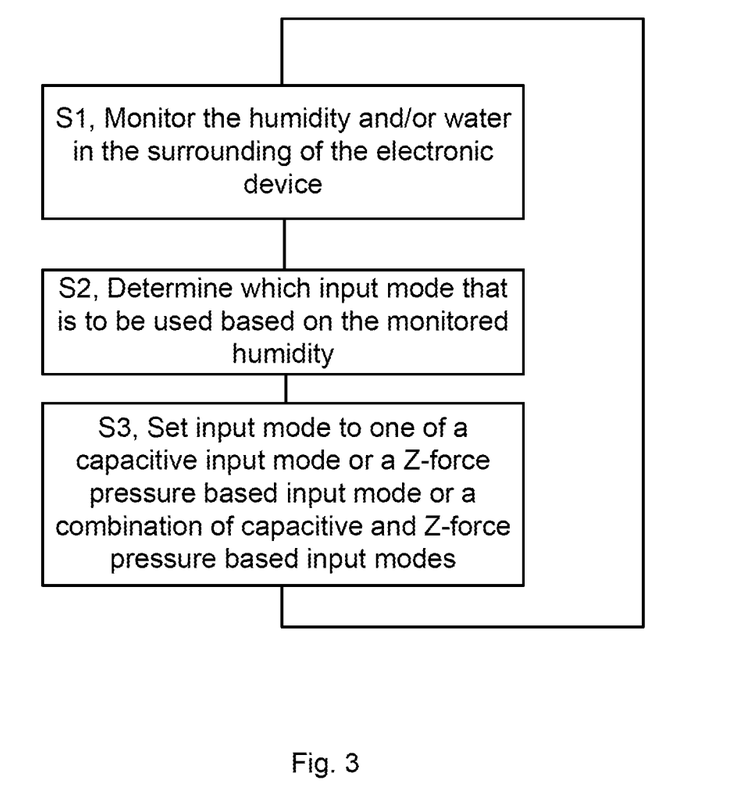
FIG. 3 illustrates a flowchart of a method for controlling the input mode of the touch screen for the electronic device.

FIG. 3 illustrates a flowchart of the method for controlling the input mode of the touch screen 10 for the electronic device 1. The electronic device comprises at least one condition detection system 4, being either a capacitive touch detection system 2 indicating water/humidity on the touch screen 10 or a separate humidity sensor 20 or a combination of the capacitive touch detection system 2 and a separate humidity sensor 20.

The first step, S1, of the method in FIG. 3 is to monitor humidity in the surrounding of the electronic device 1 by means of the condition detection system 4, preferably measuring a relative humidity in the surrounding of the electronic device 1. Retrieval of humidity values is performed at a preferred rate of 4 Hz however the rate can be varied depending on if the electronic device is in sleep mode or low in battery etc.

The second step, S2, in FIG. 3, is determining a preferred input mode, based on the monitored humidity in relation to predetermined values. The humidity can be compared and evaluated on the basis of the relative humidity and the current change rate of the relative humidity. A high change rate could indicate that the electronic device 1 has been submerged or retrieved from water indicating a need for a switch in input mode I, II, III. The monitored humidity conditions is evaluated to determine if a first input mode I using only capacitive sensing for the touch screen 10 is to be used, or if a second input mode II using only Z-force sensing for the touch screen is to be used for pressure detection, or if a third input mode III being a combination of the first and second input modes for the touch screen is to be used.

The input signals from the touch screen 10 are affected by the humidity in the surrounding of the electronic device 1 indicating the level of humidity in the surrounding of the electronic device, whereby the determination of the humidity according to the invention is done by analyzing the distortion effect caused by the surrounding humidity. Hence, too much distortion means that the current input mode of the touch screen 10 is automatically switched to another input mode or if the distortion is not as high as predetermined, the input mode of the touch screen 10 is maintained.

The third step, S3, in FIG. 3, is to use the determined input mode I, II, III for the touch screen 10 by allowing the humidity state handler 200 to activate the required touch input drivers.

Figure 4:
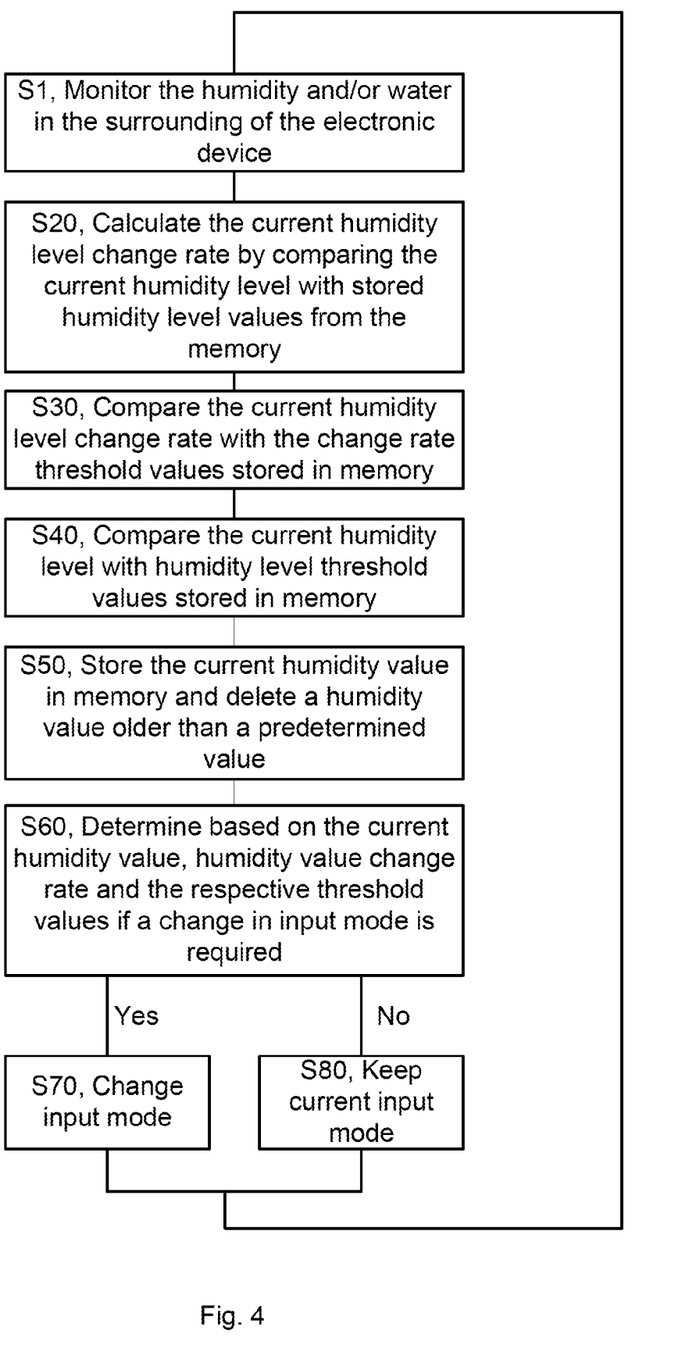
FIG. 4 illustrates a flowchart of a method for controlling the input mode of the touch screen for the electronic device using both the change rate of the relative humidity and the current value of relative humidity as indicators for changing/switching or maintaining current input mode.

FIG. 4 illustrates a flowchart of the method for controlling the input mode of the touch screen 10 for the electronic device 1 using both the change rate of the relative humidity and the current value of relative humidity as indicators for switching input mode.

The first step, S1, of the method is to monitor humidity in the surrounding of the electronic device 1 by means of the condition detection system 4.

The second step, S20, is to calculate the current humidity level change rate by comparing the current humidity level with stored humidity level values from the memory 30.

The third step, S30, is to compare the current humidity level change rate with the change rate threshold values. The threshold values describe an allowed increase rate or decrease rate that is allowed before switching the input mode. A rapid increase in humidity level can e.g. indicate that the electronic device 1 is suddenly submerged in water and thereby request a switch in input mode to the z-force touch detection system. An increase or decrease in humidity in excess of 100%/s is a preferred change rate threshold value for switching input mode.

The fourth step, S40, is to compare the current humidity level with humidity level threshold values stored in the memory. A high humidity level could be an indicator that a switch of input mode from the capacitive touch detection system 2 to the z-force touch detection system 3 is necessary. A preferred threshold value for when switching may be performed from capacitive touch detection to z-force touch detection is when the relative humidity is equal to or greater than 100%. During humidity levels below 100%, i.e. between 0%-99% the capacitive touch detections system 2 may be used. However, other threshold values may also be applied according to sensitivity settings, user preferences etc.

The fifth step, S50, is to store the current humidity value together with system time to enable calculation of humidity change rate and deletion of a humidity value older than a predetermined value to ensure that the memory does not get overloaded.

The sixth step, S60, is to determine based on the current humidity value, humidity value change rate and the respective threshold values if a change in input mode is required.

The seventh and eighth step, S70 and S80, is to switch the input mode by allowing the humidity state handler 200 to activate the required touch driver or to maintain the current input mode.

Figure 5:
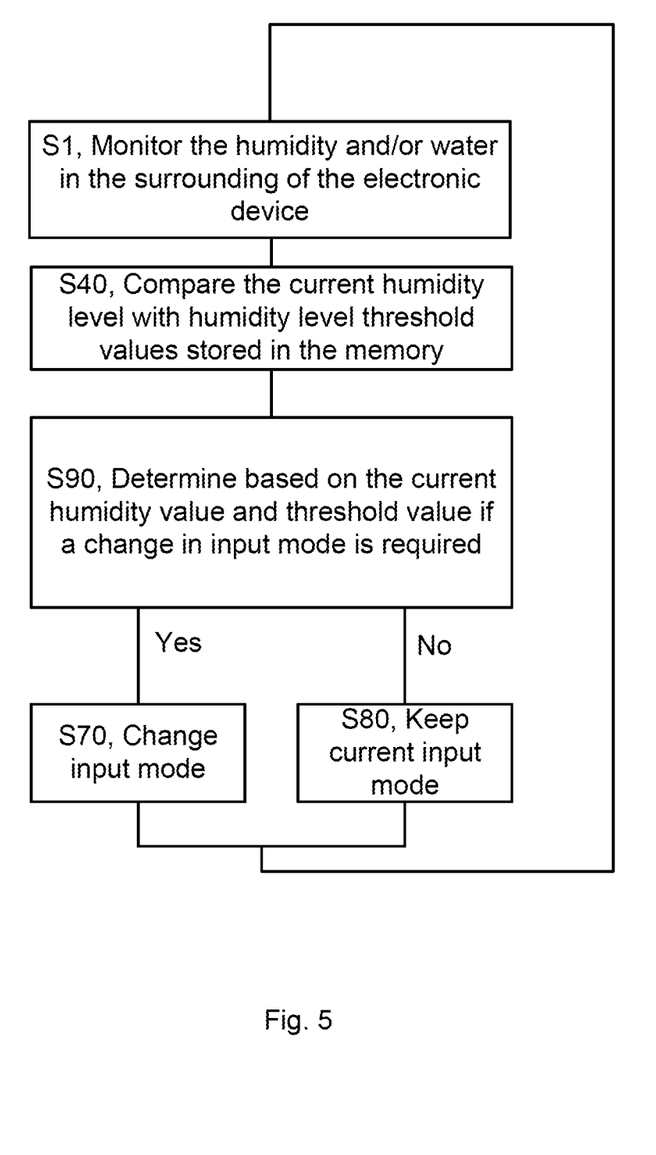
FIG. 5 illustrates a flowchart of a method for controlling the input mode of the touch screen for the electronic device using only the current value of relative humidity as an indicator for changing/switching input mode or maintaining current input mode.

FIG. 5 illustrates a flowchart of the method for controlling the input mode of the touch screen 10 for the electronic device 1 using only the current value of relative humidity as an indicator for switching input mode.

The first step, S1, is to monitor the humidity in the surrounding of the electronic device by means of the condition detection system 4.

The second step, S40, is to compare the current humidity level with humidity level threshold values stored in the memory.

The third step, S90, is to determine based on the current humidity value and humidity threshold value if a change in input mode is required.

The fourth and fifth step, S70 and S80, is to switch the input mode by allowing the humidity state handler 200 to activate the required touch driver or to maintain the current input mode.

Figure 6:
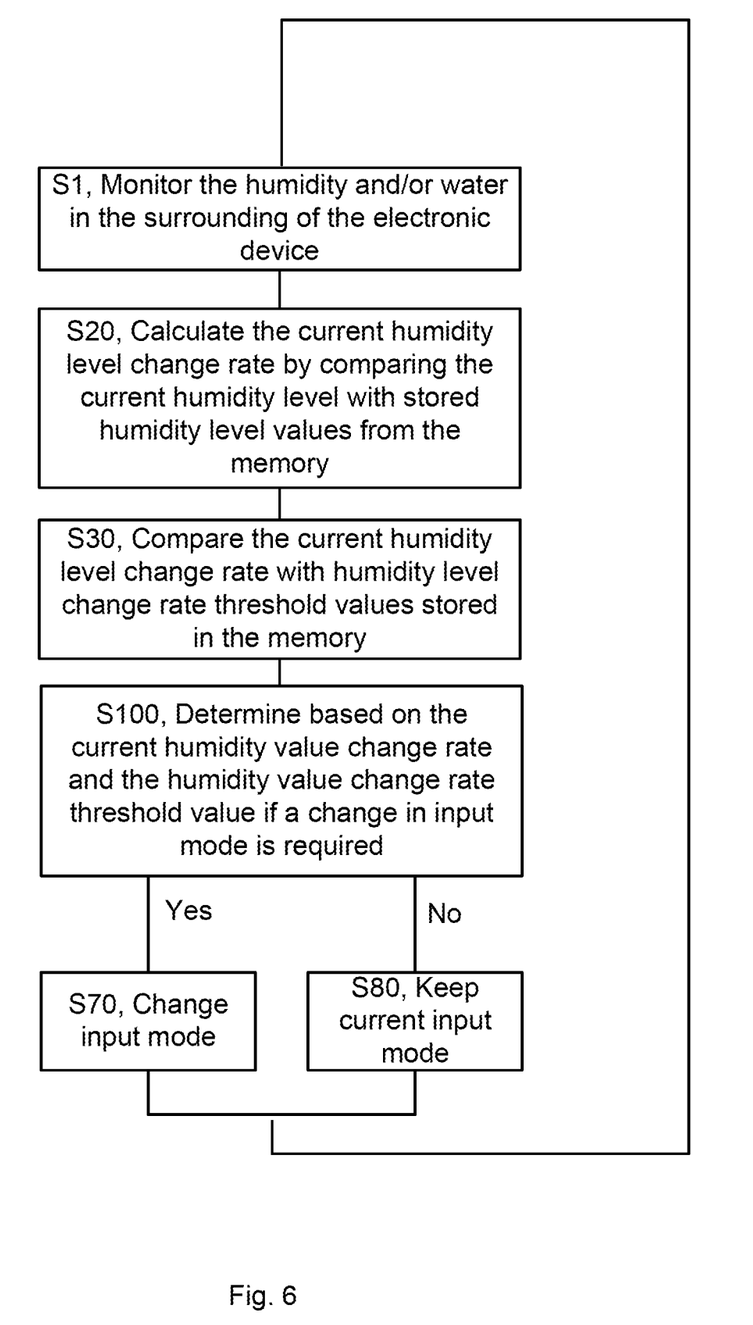
FIG. 6 illustrates a flowchart of a method for controlling the input mode of the touch screen for the electronic device using only the change rate of the relative humidity as an indicator for changing/switching input mode or maintaining current input mode.

FIG. 6 illustrates a flowchart of the method for controlling the input mode of the touch screen 10 for the electronic device 1 using only the change rate of the relative humidity as an indicator for switching input mode.

The first step of FIG. 6, S1, is to monitor the humidity in the surrounding of the electronic device by means of the condition detection system 4.

The second step of FIG. 6, S20, is to calculate the current humidity level change rate by comparing the current humidity level with stored humidity level values from the memory 30.

The third step, S30, is to compare the current humidity level change rate with the change rate threshold values stored in the memory 30.

The fourth step, S100, is to determine based on the current humidity value change rate and the humidity value change rate threshold value if a change in input mode is required.

The fifth and sixth step, S70 and S80, is to switch the input mode by allowing the humidity state handler 200 to activate the required touch driver or to maintain the current input mode.

Figure 7:
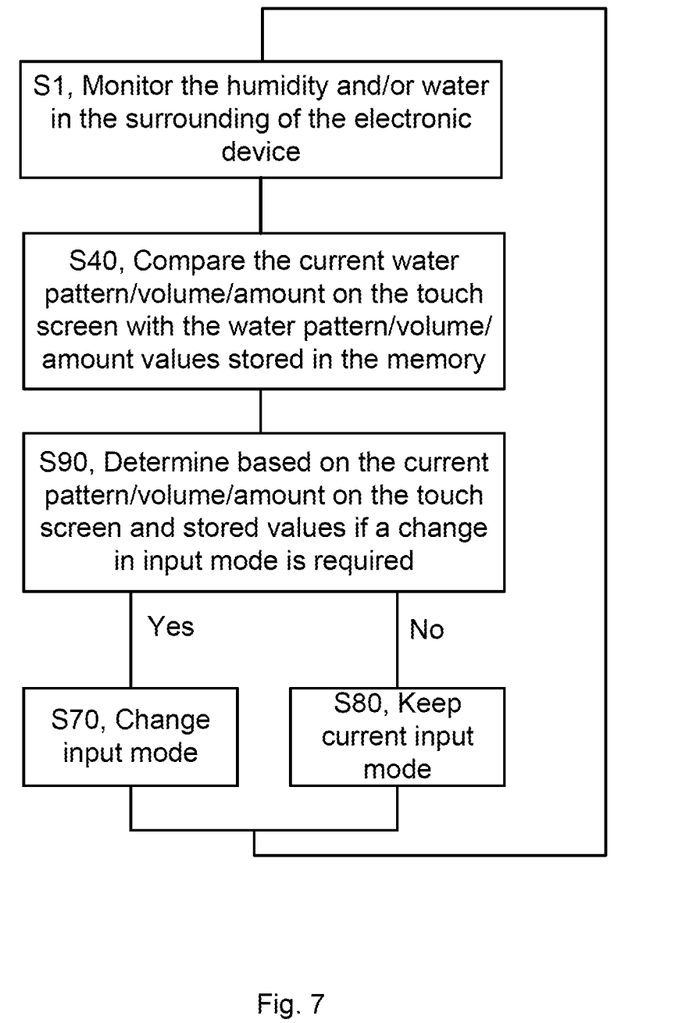
FIG. 7 illustrates a flowchart of a method for controlling the input mode of the touch screen for the electronic device using amount/patterns/volume of water on the touch screen as an indicator for changing/switching input mode or maintaining current input mode.

FIG. 7 illustrates a flowchart of the method for controlling the input mode of the touch screen 10 for the electronic device 1 using the current water pattern/volume/amount on the touch screen and/or the change rate of the water pattern/volume/amount on the touch screen as an indicator for switching input mode.

The first step of FIG. 7, S1, is to monitor the humidity and/or water in the surrounding of the electronic device by means of the condition detection system 4.

The second step of FIG. 7, S40, is to compare the current water pattern/volume/amount on the touch screen 10 with the water pattern/volume/amount values stored in the memory 30.

The third step of FIG. 7, S90, is to determine based on the current pattern/volume/amount on the touch screen and stored values if a change in input mode is required.

The fourth and fifth step of FIGS. 7, S70 and S80, is to switch the input mode by allowing the humidity and water/wetness state handler 200 to activate the required touch driver or to maintain the current input mode.

This detection of signals by means of the touch screen 10 is done by profiling of water/droplet patterns indicating presence of water on the touch screen, in different amounts, volumes and/or patterns and/or with changing areas and directions when water flows over and on the screen. This detection of signals generated by water by the touch screen and its associated circuitry and stored predefined water amounts, volumes and/or patterns and their change rates, e.g. when water flows over the touch screen, may be done by probability calculations and comparing finger patterns with different water patterns, water volumes and/or water amounts on the screen to improve positioning of where on the touch screen the input is done and make the positioning more accurate by the inventive device. This signal detection of the touch screen 10 may be utilized separately and in combination with the separate detection of signals that further enhance the switching, making the switching seamless to the user, and improving the switching to a more suitable input mode depending on the humid and wet conditions around the electronic device by itself.

The invention claimed is:

1. A method for controlling an input mode of a touch screen of an associated electronic device comprising a condition detection system, the method comprising:
monitoring humidity in an area surrounding the associated electronic device using the condition detection system by detecting a first signal from an associated humidity sensor indicating a level of humidity in the area surrounding the associated electronic device and detecting a second signal resulting from an input on the touch screen indicating a presence of water on the touch screen;
determining, based on the humidity in relation to one or more predetermined humidity threshold values, if a first input mode (I) using only a capacitive sensing for the touch screen is to be used, or if a second input mode (II) using only a Z-force sensing for the touch screen is to be used for pressure detection, or if a third input mode (III) being a combination of the first and second input modes for the touch screen is to be used, and
using the determined input mode for receiving an input on the touch screen from an associated user of the associated electronic device.

2. A method for controlling an input mode of a touch screen according to claim 1, further comprising:
determining a time rate of change of the humidity in the area surrounding the associated electronic device based on the monitored humidity and a previously acquired humidity level in the area surrounding the associated electronic device; and
determining the input mode based on the time rate of change in relation to one or more predetermined humidity change rate threshold values.

3. A method for controlling an input mode of a touch screen according to claim 1, further comprising:
determining, based on the monitored humidity in relation to one or more predetermined humidity level threshold values, if the monitored humidity is below a selected predetermined humidity level threshold value, that the first input mode (I) using only the capacitive sensing for the touch screen is to be used for detecting a position of a touch point of the touch screen, or if the monitored humidity is greater than the predetermined value, that the second input mode (II) using only the Z-force touch sensing for the touch screen is to be used for pressure detection and for detecting the position of the touch input of the touch screen.

4. A method for controlling an input mode of a touch screen according to claim 2, further comprising:
determining, based on the monitored humidity in relation to the one or more predetermined humidity change rate threshold values, if a decrease in the rate of change of the humidity is larger than a predetermined value, that the first input mode (I) using only the capacitive sensing for the touch screen is to be used for detecting a position of a touch point of the touch screen, or if an increase in the rate of change of the humidity is larger than the predetermined value, that the second input mode (II) using only the Z-force touch sensing for the touch screen is to be used for pressure detection and for detecting the position of the touch input of the touch screen.

5. A method for controlling an input mode of a touch screen according to claim 1, further comprising:
   determining, based on the monitored humidity in relation to one or more predetermined humidity level threshold values, if the monitored humidity is below a selected predetermined humidity level threshold value, that the first input mode (I) using the capacitive sensing and the second input mode (II) using the Z-force touch sensing for pressure detection is to be used as the third input mode (III) by the touch screen.

6. A method for controlling an input mode of a touch screen according to claim 1, further comprising:
   determining, based on the monitored humidity in relation to one or more predetermined humidity level threshold values, if the monitored humidity is below 100% relative humidity, that the first input mode (I) using only the capacitive sensing for the touch screen is to be used.

7. A method for controlling an input mode of a touch screen according to claim 1, further comprising:
   determining, based on the monitored humidity in relation to one or more predetermined humidity level threshold values, if the monitored humidity is greater than or equal to 100% relative humidity, that the second input mode (II) using only the Z-force touch sensing for the touch screen is to be used for pressure detection and for detecting a position of a touch input of the touch screen.

8. A method for controlling an input mode of a touch screen according to claim 1, further comprising:
   determining, based on the monitored humidity in relation to one or more predetermined humidity level threshold values, if the monitored humidity is below 100% relative humidity, that the first input mode (I) using the capacitive sensing and the second input mode (II) using the Z-force touch sensing for pressure detection is to be used as the third input mode (III) by the touch screen.

9. A method for controlling an input mode of a touch screen according to claim 1, further comprising:
   profiling the second signal representative of the presence of the water on the touch screen to determine one or more of a water pattern or a droplet pattern indicating a presence of a water pattern on the touch screen;
   comparing the one or more of the water or droplet patterns with a predetermined finger pattern representative of a signal resulting from an input on the touch screen by a finger of an associated user touching the touch screen; and
   selectively determining, based on the comparing, a selected one of the first, second, or third input modes to be used by the touch screen.

10. A method for controlling an input mode of a touch screen according to claim 9, further comprising:
    selectively determining, based on the comparing, a change from a selected one of the first, second, or third input modes to be used by the touch screen, to a different one of the first, second, or third input modes to be used by the touch screen.

11. An electronic device comprising:
    a touch screen;
    at least two touch detection systems comprising a capacitive touch detection system and a Z-force touch detection system;
    a condition detection system, wherein
    the touch screen is configured for operation in one of a first input mode, a second input mode, or in a third input mode being a combination of the first and second input modes,
    a memory,
    wherein the condition detection system is configured to determine humidity in an area surrounding the electronic device by detecting a first signal from an associated humidity sensor indicating a level of humidity in the area surrounding the electronic device and detecting a second signal resulting from an input on the touch screen indicating a presence of water on the touch screen,
    the electronic device further comprising a humidity condition handling and processing unit configured to:
       determine, based on the humidity in relation to one or more predetermined humidity threshold values, if the first input mode (I) using only the capacitive touch detection system for the touch screen is to be used, or if the second input mode (II) using only the Z-force touch detection system for the touch screen is to be used for pressure detection, or if the third input mode (III) being the combination of the first and second input modes for the touch screen is to be used, and
       to set the determined input mode to be used by the touch screen for receiving an input on the touch screen from an associated user of the electronic device.

12. An electronic device according to claim 11, wherein the humidity condition handling and processing unit is configured to:
    determine a time rate of change of the humidity in the area surrounding the associated electronic device based on the monitored humidity and a previously acquired humidity level in the area surrounding the associated electronic device, and
    determine the input mode based on the time rate of change in relation to one or more predetermined humidity change rate thresholds.

13. An electronic device according to claim 11, wherein the humidity condition handling and processing unit is configured to, if the monitored humidity is below a predetermined humidity level threshold value, set the first input mode (I) with only the capacitive touch detection system to be used by the touch screen for detecting a position of a touch input on the touch screen or, if the monitored humidity is greater than a predetermined humidity level threshold value, set the second input mode (II) with only the Z-force touch detection system to be used by the touch screen for pressure detection and for detecting the position of the touch input on the touch screen.

14. An electronic device according to claim 11, wherein:
    the condition detection system is configured to:
       profile the second signal representative of the presence of the water on the touch screen to determine one or more of a water pattern or a droplet pattern indicating a presence of a water pattern on the touch screen; and
       compare the one or more of the water or droplet patterns with a predetermined finger pattern representative of a signal resulting from an input on the touch screen by a finger of an associated user touching the touch screen; and
    the humidity condition handling and processing unit is configured to:
       selectively determining, based on the comparing, a selected one of the first, second, or third input modes to be used by the touch screen.

15. An electronic device according to claim 14, wherein:
    the humidity condition handling and processing unit is configured to selectively determine, based on the comparing, a change from a selected one of the first, second, or third input modes to be used, to a different one of the first, second, or third input modes to be used by the touch screen.

* * * * *